No. 697,291. Patented Apr. 8, 1902.
O. SUNDT.
LEADING SPINDLE.
(Application filed Nov. 20, 1901.)

(No Model.)

WITNESSES
L. A. Conner
L. M. Redman

INVENTOR
Oscar Sundt
by Bakewell & Byrnes
his attys.

THE NORRIS PETERS CO., PHOTO-LITHO., WASHINGTON, D. C.

UNITED STATES PATENT OFFICE.

OSCAR SUNDT, OF CLEVELAND, OHIO, ASSIGNOR TO THE GARRETT-CROMWELL ENGINEERING COMPANY, OF CLEVELAND, OHIO, A CORPORATION OF OHIO.

LEADING-SPINDLE.

SPECIFICATION forming part of Letters Patent No. 697,291, dated April 8, 1902.

Application filed November 20, 1901. Serial No. 83,022. (No model.)

*To all whom it may concern:*

Be it known that I, OSCAR SUNDT, of Cleveland, in the county of Cuyahoga and State of Ohio, have invented a new and useful Leading-Spindle, of which the following is a full, clear, and exact description, reference being had to the accompanying drawings, forming part of this specification, in which—

Figure 1:
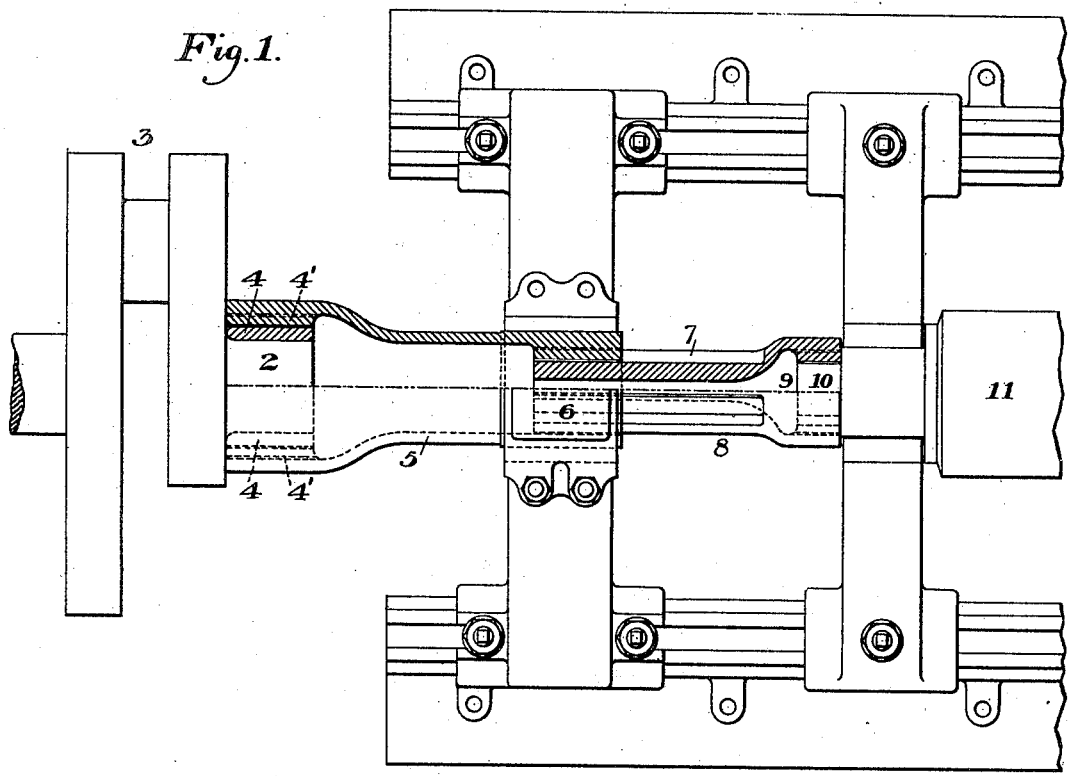
Figure 2:
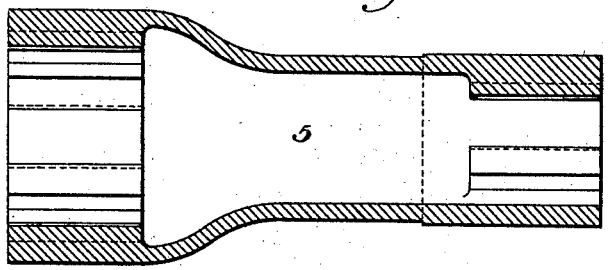
Figure 3:
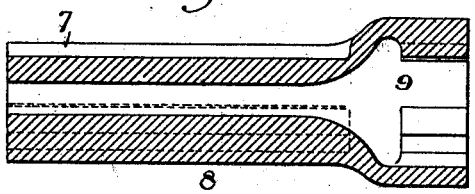

Figure 1 is a side elevation, partly in section, showing my improved spindle arranged to connect an overhung driving-crank with a driven roll; and Figs. 2 and 3 are detail views showing the parts of the spindle.

My invention relates to the leading-spindles employed for connecting a driving with a driven shaft, and particularly to those wherein the spindle is of such length that it is desirable to use a support for its intermediate part. Heretofore in using these long leading-spindles it has been difficult to provide a bearing for the intermediate spindle portion, owing to the rocking or wabbling action of the spindle resulting from the non-alinement of its ends. My invention overcomes this difficulty; and it consists in forming the spindle in two or more portions having a loose joint or connection between their meeting ends, with bearings supporting one of the spindle parts at or near such joint.

It further consists in the construction and arrangement of the parts, as hereinafter more fully described and claimed.

In the drawings, 2 represents a stub-shaft projecting from a double overhung driving-crank 3. A ring 4 is secured to this stub-shaft and is provided with a series of radially-projecting lugs 4', which fit within corresponding recesses in the enlarged end of a hollow spindle portion 5. This part 5 of the spindle is supported and guided at its other end by means of a bearing 6, surrounding the cylindrical end portion, and this bearing end portion is also provided with a hole having recesses with which engage the longitudinal ribs 7 of the other spindle portion 8. These ribs or projections of the latter spindle part fit loosely in the recesses of the other part and allow a certain amount of rocking or wabbling of the part 8. I have shown these ribs or projections as extending throughout a considerable portion of the length of the smaller spindle part, while the receiving-hole in the larger spindle part is extended into the hollow interior of this larger part, thus allowing a telescoping action of the two portions when for any reason there is an endwise thrust upon either part. The smaller spindle portion at its end opposite to the spindle-joint is provided with a hollow head portion 9, having a hole with recesses for receiving corresponding lugs on the neck 10 of the roll 11, these parts being somewhat loosely fitted to allow rocking or wabbling. The parts are supported by the connections at the opposite ends of the spindle and by the intermediate bearing of the spindle.

The advantages of my invention result from the forming of the spindle in two or more parts, one part driving the next, thus allowing an ordinary bearing to be used at or near the joint between the two parts, and, further, from the telescoping feature, which is especially advantageous in the case of breaks or accidents causing an end thrust upon one of the parts.

Many changes may be made in the form and arrangement of the spindle, which may be made in more than two parts without departing from my invention.

I claim—

1. A leading-spindle formed of a plurality of parts connected end to end, the end sections having loose detachable connections at their outer ends arranged to support said ends, and an intermediate bearing for the spindle at or near a joint between its parts; substantially as described.

2. In leading-spindle connections, an overhung crank, a spindle having a detachable loose connection therewith at one end and consisting of a plurality of parts having a telescopic connection and a loose supporting connection at the other end of the spindle, the telescoping connection being arranged to prevent injury from breaking of the driving connections; substantially as described.

3. A leading-spindle formed of a plurality of parts having telescopic end to end connections with each other, the end sections having loose detachable connections at their outer ends arranged to support said ends, and an intermediate bearing for the spindle at or near a joint therein; substantially as described.

4. A leading-spindle formed of several sections, the end sections having interlocking and supporting connections at their outer ends, one part having a cylindrical outer portion at the intermediate joint, and a bearing supporting said cylindrical part; substantially as described.

5. A leading-spindle formed in two parts, each having an interlocking connection at its outer end with the supporting-shaft, the larger part being hollow, and having an end hole with recesses, the smaller part having projections engaging said recesses, and a bearing surrounding the joint; substantially as described.

In testimony whereof I have hereunto set my hand.

OSCAR SUNDT.

Witnesses:
  J. C. CROMWELL,
  WALTER L. NASON.